3,812,051
DAYLIGHT FLUORESCENT PIGMENTS AND
PROCESS FOR THEIR PREPARATION
Kurt Merkle, Hofheim, Taunus, Otto Fuchs and Helmut Tröster, Frankfurt am Main, and Siegfried Noetzel, Mainz, Germany, assignors to Farbwerke Hoechst Aktiengesellschaft vormals Meister Lucius & Bruning, Frankfurt am Main, Germany
No Drawing. Filed Apr. 12, 1971, Ser. No. 133,355
Claims priority, application Germany, Apr. 14, 1970,
P 20 17 765.5
Int. Cl. C09k 1/02
U.S. Cl. 252—301.2 R
4 Claims

ABSTRACT OF THE DISCLOSURE

Daylight fluorescent pigments on the basis of condensate resins in fluorescent dyestuffs of the benzoxanthane and thio-benzoxanthane series. These daylight fluorescent pigments may be used for preparing fluorescent paints or printing inks and for coloring plastics, especially vinyl polymers. They show an intense bluish green to yellow fluorescence and have a very good fastness to light.

Since the last years, the daylight fluorescent pigments have a large field of application. They are used for the preparation of fluorescent paints, fluorescent printing inks such as screen printing inks, intaglio printing inks, book printing inks and offset-litho-colors and fluorescent plastics, above all vinyl polymers, as for example polyvinyl chloride, polystyrol and polymethyl-methacrylate. On the other side they serve for coloring natural or synthetic rubber mixtures.

The daylight fluorescent pigments hitherto known, however, have a relatively bad fastness to light. Therefore, the objects colored or printed with daylight fluorescent pigments turn very pale under the action of daylight after a relatively short time, partly already in the course of some weeks, and they loose the desired fluorescent effect.

The present invention relates to new daylight fluorescent pigments on the basis of condensate resins and fluorescent dyestuffs, which are characterized by a content of dyestuffs of the general formula

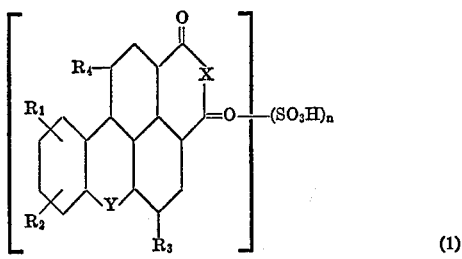

wherein X is oxygen or a >N—R— group, in which R is hydrogen or optionally substituted alkyl, cycloalkyl or aryl, a heterocyclic ring system, hydroxyl or a group —NH—Z, wherein Z represents hydrogen, optionally substituted alkyl, aryl, a heterocyclic ring system, acyl, alkyl-sulfonyl or aryl-sulfonyl; $R_1$ and $R_2$ represent hydrogen, halogen, alkyl, alkoxy, aryl, carbalkoxy or nitril; $R_3$ represents hydrogen or optionally substituted alkoxy group; $R_4$ is hydrogen or optionally substituted alkoxy; Y is oxygen or sulfur; and $n$ is a number of 0 to 3.

The invention further relates to a process for the preparation of the daylight fluorescent pigments, which comprises incorporating dyestuffs of the above general formula (1) into the starting components of condensate resins or in pre-condensates thereof, thermo-setting the resin components and converting the colored products thus-obtained into a finely divided form.

When in the grouping >N—R of the above formula, R represents alkyl, it is a straight-chained or branched alkyl which may contain 1 to 20 carbon atoms. Examples are the methyl, ethyl, n-propyl, i-propyl, n-butyl, i-butyl, octyl, dodecyl, stearyl and eicosyl radical. However, it does preferably not contain more than 6 carbon atoms. These alkyl groups may carry any substituents desired, for example hydroxyl groups, alkoxy groups, preferably having 1 to 8 carbon atoms, alkoxy-alkoxy groups which contain each 1 to 8 carbon atoms, acyloxy groups, especially the acetoxy, propionyloxy and benzoyloxy group, cycloalkoxy groups, especially the cyclohexoxy group, carboxylic acid groups, carboxylic acid amide groups and carboxylic acid ester groups, especially carboxylic acid alkyl ester groups having 1 to 4 carbon atoms in the alkyl radical. The alkyl groups may be further substituted by phenyl radicals, which themselves may be substituted, for example by lower alkyl or alkoxy groups or halogen atoms, especially chlorine or bromine atoms. The alkyl radicals may contain one or two of the above-mentioned substituents. Moreover, the radical R may contain cycloalkyl, especially cyclohexyl, or a heterocyclic ring system, such as pyridyl or 1,3,5-triazinyl, which may be substituted by amino, phenyl or lower alkyl. Examples for R having the meaning of aryl are for example phenyl and naphthyl, which may further contain 1 to 3 substituents. Among these substituents there may be cited especially alkyl and alkoxy groups having 1 to 4 carbon atoms, sulfonamide, carbonamide, amino and hydroxy groups as well as halogen atoms, especially chlorine and bromine.

Besides the hydrogen atom, the following groups are considered to have the meaning under Z.

Straight-chained or branched alkyl having preferably 1 to 8 carbon atoms which may be substituted, for example by hydroxyl or lower alkoxy or halogen, especially chlorine or bromine atoms. As aryl there is especially considered phenyl or naphthyl, which both may be substituted by alkyl or alkoxy having 1 to 4 carbon atoms, carbonamido or sulfonamido groups or halogen atoms, especially chlorine or bromine atoms. Examples for heterocyclic ring systems with the meaning of Z are pyridyl, benzimidazolyl and benzothiazolyl. If Z stands for acyl, the acetyl, propionyl or benzoyl radical are especially concerned. When Z has the meaning of alkylsulfonyl, this alkyl radical preferably contains 1 to 4 carbon atoms. Examples for arylsulfonyl are especially phenylsulfonyl, which may be substituted by lower alkyl or alkoxy, halogen, especially chlorine or bromine, and by carbonamido or sulfonamido groups.

If $R_1$ and $R_2$ of the above formula are halogen atoms, they especially concern the chlorine or bromine atoms. In the case of alkyl and alkoxy under the meaning of $R_1$ and $R_2$, these groups preferably contain 1 to 4 carbon atoms. If $R_1$ and $R_2$ are aryl, phenyl is preferably concerned, which may be substituted, if desired. Examples for carbalkoxy ($R_1$ and $R_2$) are especially carbomethoxy and carboethoxy.

$R_3$ represents hydrogen or alkoxy having preferably 1 to 4 carbon atoms, which may be substituted by halogen, preferably chlorine or bromine, hydroxy, alkoxy having 1 to 4 carbon atoms, aryloxy, for example the phenoxy group, aryl, for example the phenyl group, or by acyloxy, especially the acetoxy, propionyloxy or benzoyloxy group.

If $R_4$ is an alkoxy group, this is preferably alkoxy having 1 to 4 carbon atoms, which may be substituted. As examples for these substituents, there may be mentioned hydroxy, halogen, especially chlorine or bromine, nitril, optionally substituted phenyl and acyloxy, for example the acetoxy, propionyloxy and benzoyloxy group.

Among the dyestuffs used according to this invention, there are preferably employed the dyestuffs of the benzoxanthene series, for these generally lead to daylight fluorescent pigments which have a still higher fastness to light than the pigments prepared with dyestuffs of the benzothioxanthene series.

The benzoxanthene or benzothioxanthene dyestuffs used according to the invention may be prepared by heating, in the presence of elementary copper or copper salts, diazonium salts of compounds of the general formula

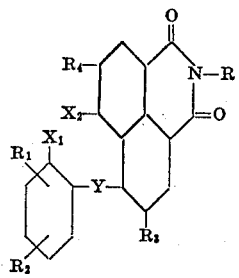

wherein $X_1$ is hydrogen and $X_2$ amino or $X_1$ amino and $X_2$ hydrogen and wherein the other substituents have the above meanings or by heating the diazonium salts of compounds of the general formulae

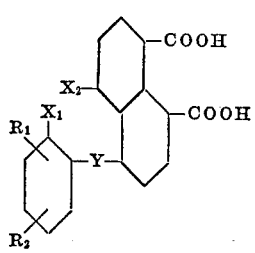 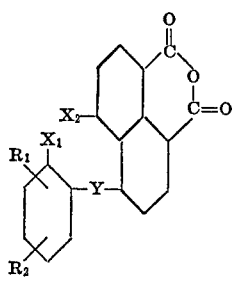

wherein the substituents have the above meanings, in the presence of elementary copper or copper salts and by condensing at elevated temperature the so-obtained benzoxanthene or benzothioxanthene derivatives of the general formula

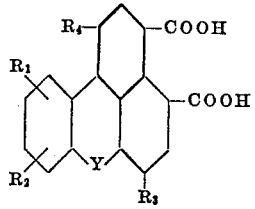 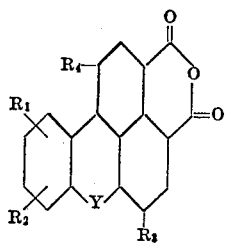

wherein the substituents have the above meanings, with amines of the general formula $$R—NH_2$$

in which R has the above meaning (British Specifications Nos. 1,095,784 and 1,112,726 and French Patent Specification No. 1,590,506).

Dyestuffs of the above formula (1), wherein $n$ is an integer of from 1 to 3, may be prepared by sulfonating in known manner the corresponding non sulfonated benzoxathene or benzothioxanthene dyestuffs. The starting compound is expediently heated in concentrated sulfuric acid or in oleum, for example with a content of 20% of $SO_3$, up to temperatures between 80° and 150° C.

As condensate resins for the daylight fluorescent pigments according to the invention there are especially considered such products which are inelastic, non-fiber-forming and brittle and which may be easily converted into a finely divided form by pulverizing. Furthermore, the resins should have a relatively high softening point, preferably above about 100° C., because otherwise the resin particles agglomerate and stick together at the grinding temperatures. Moreover the resins should be insoluble or nearly insoluble in the solvents generally used for preparing paints and printing inks, such as white spirit, toluene, or xylolene, and they should not swell in these solvents. The resins must also have a good transparency and a sufficient fastness to light. The resins, which comply with these requirements and which have partly been used for preparing daylight fluorescent pigments, are generally known.

As examples for resins which are particularly suitable for the preparation of the daylight fluorescent pigments according to the invention, there may be cited:

(a) Interlaced polyester resins from aromatic polycarboxylic acids or anhydrides thereof, especially from aromatic di- and tricarboxylic acids such as phthalic acid, isophthalic acid or trimellitic acid, and bi- or polyhydric alcohols, as for example ethplene glycol, glycerine, pentaerythritol, trimethylol-propane and neopentylglycol (German patent specification No. 961,575);

(b) Unplasticized, unmodified acid amide-formaldehyde resins, for example urea-formaldehyde resins (U.S. Pat. No. 2,498,592);

(c) Unplasticized, alcohol-modified acid amide-formaldehyde resins, for example urea formaldehyde resins modified with butyl alcohol (U.S. Pat. No. 2,498,592);

(d) Unplasticized, unmodified aminotriazine-formaldehyde resins (British patent specifications Nos. 734,181 and 748,484);

(e) Unplasticized, alcohol-modified aminotriazine formaldehyde resins (Bitish patent specification No. 734,181);

(f) Arylsulfonamide-acid amide-formaldehyde resins; as arylsulfonamides there are considered above all o- and/or p-toluene-sulfonamide, benzene-sulfonamide and alkyl derivatives thereof and mixtures thereof and as acid amides urea, thiourea, dicyanodiamide, guanidine, malondiamide, biuret and succinimide (British Patent Specification No. 702,616); and (g) Arylmonosulfonamide-aminotriazine-formaldehyde resins; as arylsulfonamides there are especially considered the compounds mentioned under (f); examples for aminotriazines are especially the 2,4-diamino-1,3,5-triazine,
2,4-diamino-6-methyl-1,3,5-triazine,
2,4-diamino-6-(3-hydroxybutyl)-1,3,5-triazine,
2,4-diamino-6-heptyl-1,3,5-triazine,
2,4-diamino-6-phenyl-1,3,5-triazine,
2,4-diamino-6-benzyl-1,3,5-triazine,
2,4,6-triamino-1,3,5-triazine (melamine),
2,4-diamino-6-($\beta$-cyanoethyl)-1,3,5-triazine, and
2,4-diamino-6-($\omega$-cyanovalero)-1,3,5-triazine and mixtures thereof.

The daylight fluorescent pigments are prepared in known manner, by incorporating dyestuffs of the above formula (1) into a starting component or into a mixture of starting components or condensates thereof, by thermosetting the resin components and converting the so-obtained dyed products into a finely divided form. The proportions of the various resin components may vary within large limits; the amounts have to be chosen in such a way that resins having the above physical properties are formed. Daylight fluorescent pigments having particularly advantageous properties, especially concerning their fastness to light, are obtained when the resin components indicated under (f) and (g) are used. When preparing daylight fluorescent pigments on the basis of these resins, it has turned out to be advantageous to mix the arylsulfonamide, the dyestuff and the aminotriazine or the urea or the urea derivative, to heat the whole and to add slowly the formaldehyde, expediently in form of the paraformaldehyde. The hardening temperatures essentially depend on the resin components used and their proportions. They generally range between about 100° and 170° C. In the case of the resins indicated under (f) and (g), the portion of acid amide/formaldehyde or amino-triazine/formaldehyde-resin should not be greater than to 80% by weight of the total amount of the resin.

The concentration of the dyestuff in the resin essentially depends on the type of resin, on the dyestuff used and on the desired application of the daylight fluorescent pigment. The dyestuff concentration generally ranges between about 0.1 and 10% by weight. The daylight fluorescent pigment preferably contains the dyestuff in a concentration which provides the best possible brilliancy, the paint or print prepared with this dyestuff having a good color intensity.

The so-obtained hardened product is then converted into a finely divided form, which may be effected by dry or wet grinding in a ball or bead mill. The grinding may be expediently carried out in the presence of water. The particle size of the daylight fluorescent pigment, which may vary within wide limits, essentially depends on the intended use. Thus, the average particle size generally ranges between about 5 and 30μ, if it is to be used for preparing screen printing inks or for preparing lacquers, and between about 0.1 and 5μ, if printing inks are to be prepared.

The daylight fluorescent pigments according to the invention may be used for preparing fluorescent paints, for example air-drying lacquers on the basis of alkyd resins, or physically drying lacquers on the basis of acryl resins and for preparing fluorescent printing inks, such as screen printing inks, book printing inks and offset-litho-colors. They are furthermore suitable for coloring plastics, with a fluorescent effect, especially of vinyl polymers such as polyvinyl chloride, polystyrol and polymethylmethacrylate.

The dyeings and prints prepared with the daylight fluorescent pigments according to the invention show a very intense bluish green to yellow fluorescence and have a good to very good fastness to light. The daylight fluorescent pigments according to the invention are far superior to the daylight fluorescent pigments known from the British Specifications Nos. 792,616 and 1,048,983 and the U.S. Patent Specifications Nos. 2,938,873 and 3,116,256, as concerns their fastness to light. Moreover, with regard to their fastness to solvents, they are at least comparable, partly far superior, to the known daylight fluorescent pigments.

The following Examples serve to illustrate the invention.

EXAMPLE 1

After heating 77 g. of p-toluene-sulfonamide up to 130° C., 1.85 g. of benzoxanthene-3,4-dicarboxylic acid anhydride-disulfonic acid and 10 g. of melamine were added while stirring. Then 20 g. of paraformaldehyde were introduced portionwise within 15 minutes at 120° to 130° C. When the addition of paraformaldehyde was complete, the mixture was heated within 15 minutes to 160° C., and the whole was well stirred for 20 minutes at 160° C. to 170° C. After cooling, a yellow green brittle resin was obtained, which was converted into a finely divided form by wet grinding in a ball mill. An air-drying alkyd resin lacquer prepared fro mthe thus-obtained pigment in the following manner, provided yellow-green lacquerings of intense green daylight fluorescence, which are distinguished by excellent fastnesses to light and bleeding.

For preparing the air-drying alkyd resin lacquer, 15 g. of ground fluorescent pigment, 17 g. of air-drying alkyd resin (Alftalat® 595 B, 60% in white spirit) and 8 g. of white spirit were ground for 20 minutes on the paint shaker in a 100 ml. plastic cup, in the presence of quartzite perls (2–3 mm. φ), and mixed with 0.3 g. of zirconium naphthenate (6%) and 0.1 g. of cobalt-naphthenate (6%).

If in the above example the same amount by weight of benzothioxanthene-3,4-dicarboxylic acid anhydride-disulfonic acid is used and the operation is carried out as described above, a yellow lacquer film of yellow green fluorescence is obtained, having a good fastness to light and an excellent fastness to bleeding.

EXAMPLE 2

Instead of the benzoxanthene-3,4-dicarboxylic acid anhydride disulfonic acid, benzoxanthene-3,4-dicarboxylic acid hydrazide in an amount of 1.75 g. was incorporated into the resin prepared according to Example 1 and an alkyd resin lacquer was prepared as described. The resulting brilliant yellow green lacquering has an excellent fastness to light. If instead of the benzoxanthene-3,4-dicarboxylic acid hydrazide equivalent amounts of 9-methyl-, 9-chloro-10-methyl-, 8-boro-, 9-methoxy or 9,10-dimethyl-benzoxanthene-3,4-dicarboxylic acid hydrazide are used, lacquerings with the same properties are obtained.

EXAMPLE 3

The process according to Example 1 was repeated, but the benzoxanthene-3,4-dicarboxylic acid anhydride-disulfonic acid was replaced by benzoxanthene - 3,4 - dicarboxylic acid imide in an amount of 1.6 g. The alkyd resin lacquering prepared with this dyestuff according to the process of Example 1 showed a very good fastness to light.

Similar results are obtained if the benzoxanthene-3,4-dicarboxylic acid imide is replaced by benzoxanthene-3,4-dicarboxylic acid -N-methyl-, -N-carbonamidomethyl-, -N-carbonamidopropyl-, -N-β-hydroxypropyl-, -N-3'-carbonamidophenyl- or -N-cyclo-hexoxypropyl imide.

EXAMPLE 4

According to the process of Example 1, a daylight fluorescent pigment was prepared from 77 g. of p-toluene-sulfonamide, 10 g. of melamine, 17.8 g. of paraformaldehyde and 2 g. of 10-methoxy-benzoxanthene-3,4-dicarboxylic acid anhydridedisulfonic acid. With an acryl resin lacquer prepared with this pigment in the manner described below, brilliant lacquer rings of an intense green fluorescence were obtained, which showed an excellent fastness to light and to bleeding.

The acryl resin lacquer was prepared in the following manner:

10.8 g. of a fluorescent pigment, 27 g. of acryl resin (Plexisol® PM 709, 40% in xylene) and 8 g. of xylene were ground in the presence of quartzite perls (2–3 mm. φ) in a 100 ml. plastic cup for 20 minutes on the paint-shaker.

Instead of the 10-methoxybenzoxanthene-3,4-dicarboxylic acid anhydride-disulfonic acid, there may be used with a similar success the 9-methyl-, 9,10-dimethyl-, 10-chloro-, 9-bromo-, 8-chlorobenzoxanthene-3,4-dicarboxylic acid anhydride-disulfonic acid or the N-methyl-, N-γ-methoxypropyl- and N-β-hydroxyethylimide of the above-mentioned benzoxanthene-3,4-dicarboxylic acid anhydride acid anhydride-disulfonic acid derivatives.

EXAMPLE 5

From 102.6 g. of p-toluene-sulfonamide, 12.6 g. of melamine, 25.5 g. of paraformaldehyde and 3.75 g. of 10-methoxybenzoxanthene - 3,4 - dicarboxylic acid-anhydride-disulfonic acid, a green fluorescent resin was prepared according to the process of Example 1, which, after grinding with an air-drying alkyd resin according to Example 1 provided a lacquer of very good fastness to light.

EXAMPLE 6

According to the process of Example 1, a greenish fluorescent yellow resin was obtained from 51.3 g. of p-toluene-sulfonamide, 12.6 g. of melamine, 10.5 g. of paraformaldehyde and 0.95 g. of 9-chloro-10-methylbenzoxanthene-3,4-dicarboxylic acid anhydride-disulfonic acid. An alkyd resin lacquer prepared from this product shows an excellent fastness to light and to bleeding.

When the above-mentioned disulfonic acid was replaced by benzoxanthene-3,4-dicarboxylic acid-N-2',4'-dimethylphenylimide-trisulfonic acid, a yellow green daylight fluorescent pigment was obtained, having similar good fastness properties.

EXAMPLE 7

45.6 g. of p-toluene-sulfonamide, 0.7 g. of benzoxanthene - 3,4 - dicarboxylic acid-N-3'-sulfonamidophenyl imide and 12.5 g. of benzoguanamine were heated while stirring to 140° C. Then 16 g. of paraformaldehyde were added portionwise in the course of 5 minutes, whereupon further 12.5 g. of benzoguanamine were added. Then the whole was heated within 15 minutes to 160° C., and stirring was continued at this temperature for 20 minutes. After cooling, a green yellow resin was obtained which, after grinding with acryl resin according to Example 4, provided a lacquer with which intense yellow-green daylight fluorescent paints were obtained having a very good fastness to light.

Acryl resin lacquers with similar properties were obtained, when the above dyestuff was replaced by equivalent amounts by weight of 10-methoxy-, 9,10-dimethyl- or 6,10 dimethoxy-benzoxanthene-3,4-dicarboxylic acid N-3'-sulfonamidophenylimide or by the corresponding -N-3'-carbonamidophenylimides.

EXAMPLE 8

102.6 g. of p-toluene-sulfonamide, 1.4 g. of 10-methoxybenzoxanthene - 3,4 - dicarboxylic acid hydrazide and 25 g. of melamine were heated while stirring to 130° C. Then 30 g. of paraformaldehyde were added portionwise within 10 minutes, after about 10 minutes the temperature was raised to 160° C. and stirring was continued at 160° C. for 20 minutes. After cooling, a green yellow, intensively green fluorescent resin was obtained, from which an acryl resin lacquer was prepared according to Example 4, which provided very brilliant intense yellow lacquerings having an excellent fastness to light.

When the above dyestuff was replaced by the equivalent amount of 10-methyl-, 10-carboxymethyl-, 6-methoxy-, 6,10-dimethoxy-benzoxanthene - 3,4 - dicarboxylic acid hydrazide or by benzoxanthene-3,4-dicarboxylic acid-4',6'-diamino-s-triazinylo-2'-imide or by the corresponding 9-methyl-, 9,10-dimethyl-, 9-chloro or 10-methoxy derivative, acryl resin lacquers were obtained having the same fastness properties.

EXAMPLE 9

51.3 g. of p-toluene-sulfonamide, 0.62 g. of 10-methoxy-benzoxanthene-3,4-dicarboxylic acid hydrazine and 18.8 g. of 2,5-diamino-6-methyl-s-triazine were heated while stirring to 120° C., and within 5 minutes 18 g. of paraformaldehyde were added portionwise. Then, within 13 minutes, the temperature was raised to 150° C. and stirring was continued for 5 minutes at 150° C. With an alkyd resin lacquer prepared from this lacquer according to Example 1, brilliant yellow paints of a good fastness to light were obtained.

EXAMPLE 10

102.6 g. of p-toluene-sulfonamide, 1.37 g. of 10-methoxy-benzoxanthene-3,4-dicarboxylic acid hydrazide and 24 g. of paraformaldehyde were stirred at 130° C., and within 5 minutes, 25.2 g. of melamine were added in 4 equal portions. After raising the temperature up to 160° C. within 5 minutes, stirring was continued at this temperature for 20 minutes. The lacquering obtained from this resin according to Example 1 showed a very good fastness to light.

EXAMPLE 11

At about 100° C., 143.5 g. of a heated unplasticized melamine-formaldehyde resin, having about 50% concentration in butanol/xylene, (Resamin® 555 F) were added to a transparent resin, prepared at 130° C. and consisting of 26.4 g. of p-toluene-sulfonamide and 9.3 g. of paraformaldehyde, which contained in dissolved form 0.9 g. of 10-methoxy-benzoxanthene-3,4-dicarboxylic acid hydrazide. Stirring was continued until a clear solution resulted. This one was hardened for 5 hours at 170° C. 98 g. of a transparent, intensively yellow green fluorescent brittle material was obtained. According to Example 4 an acryl resin lacquer of good fastness to light was obtained.

If benzoxanthene - 3,4 - dicarboxylic acid-N-3'-sulfonamidophenyl-imide or 10-methoxybenzoxanthene-3,4-dicarboxylic acid-N-3'-sulfonamidophenyl hydrazide is used as fluorescent dyestuff, nearly the same result is obtained. When using benzothioxanthene-3,4-dicarboxylic acid hydrazides, benzothioxanthene-3,4-dicarboxylic-N-3'-sulfonamidophenyl imide, -N-3'-sulfonamidophenyl hydrazide or the corresponding 9,10-dimethyl-, 10 bromo- or 8-chloro derivatives, brilliant yellow acryl resin lacquers of a good fastness to light are obtained.

EXAMPLE 12

68.4 g. of p-toluene-sulfonamide, 0.9 g. of 6-methoxybenzoxanthene-3,4-dicarboxylic acid hydrazide and 12 g. of urea were heated to 100° C., and 24 g. of paraformaldehyde were introduced portionwise within 5 minutes. Within a further 8 minutes, the temperature was increased to 135° C. and stirring was continued for 20 minutes at 135° C. to 140° C. With the yellow greenish fluorescent pigment thus obtained excellent alkyd resin lacquers of good fastness to light were obtained.

EXAMPLE 13

68.4 g. of p-toluene-sulfonamide and 1.6 g. of 10-methoxy-benzoxanthene - 3,4 - dicarboxylic acid hydrazide were heated while stirring up to 115° C. Then 5 g. of paraformaldehyde were added. 16.8 g. of dicyanodiamide and subsequently 19 g. of paraformaldehyde were added in several portions to the melt formed. When the paraformaldehyde was added, the temperature was increased within 15 minutes from 105° C. to 130° C. An alkyd resin lacquer prepared in known manner with this fluorescent pigment provided brilliant yellow lacquerings of good fastness to light.

EXAMPLE 14

68.4 g. of p-toluene-sulfonamide and 1.9 g. of 6,10-dimethoxy-benzoxanthene-3,4-dicarboxylic acid hydrazide were heated while stirring to 115° C.; then 4 g. of paraformaldehyde were added. 38.4 g. of δ-cyanovaleroguanamine and then 20 g. of paraformaldehyde were added portionwise to the melt within 6 minutes at 100° C. to 105° C. Then the temperature was raised within 12 minutes to 140° C., and stirring was continued at this temperature for 20 minutes. The fluorescent pigment prepared thereof showed in acryl resin lacquers a very good fastness to light.

Instead of the above-mentioned hydrazide the benzoxanthene-3,4-dicarboxylic acid-4'-amino-6'-phenyl-, 4'-amino-6'-methyl-, 4'-amino - 6' - (β-cyano)-ethyl or 4'-amino-6'-(β-hydroxy)-ethyl-1,3,5-triazinyl-2'-imide or the corresponding 10-methoxy-, 9-methyl- or 9-chloro-derivatives of these triazinyl imides may be used with similar results.

EXAMPLE 15

68.4 g. of p-toluene-sulfonamide and 1.5 g. of benzoxanthene-3,4-dicarboxylic acid anhydride-disulfonic acid were heated while stirring to 120° C. Then 12 g. of urea and subsequently 24 g. of paraformaldehyde were added portionwise within 10 minutes. Within about 10 minutes, the temperature was raised to 140° C., and the mixture was stirred for 20 minutes at 140° C. The ground yellow green fluorescent resin was ground with air-drying alkyd resin according to Example 1. The thus-obtained alkyd resin lacquer had an excellent fastness to light.

EXAMPLE 16

45 g. of the fluorescent pigment prepared according to Example 9 were stirred with a high energy stirrer in 36 g. of varnish I [65% of linseed oil alkyd (58–65% oil content), 35% of test petrol], 6 g. of varnish II (70% of colophonium-modified phenol resin, 30% of test petrol) and 8 g. of linseed oil-stand oil (60 poise). After addition of 1 g. of a film-preventing agent and 4 g. of dried material, the so-obtained printing ink was ground on the three roller mill. The brilliant yellow prints prepared thereof were distinguished by a very good fastness to light.

EXAMPLE 17

2 g. of the fluorescent pigment obtained according to Example 1 were incorporated, on a double roller mixing device for 8 minutes at a temperature of 160° C. and a friction of 1:1.2 into 98 g. of a polyvinylchloride mixture consisting of 67% of polyvinyl chloride, 31% of dioctylphthalate and 2% of organo-tin-stabilizer (Advastab® 17 M). The intensive yellow green fluorescent polyvinyl chloride coat was stripped off from the roller and compression-moulded for 5 minutes at 160° C. It had excellent fastnesses to light and bleeding. Yellow green to orange yellow daylight fluorescent pigments having similar good fastness to light and having a yellow to yellow green fluorescence, could be prepared, if in the above examples the following dyestuffs are used.

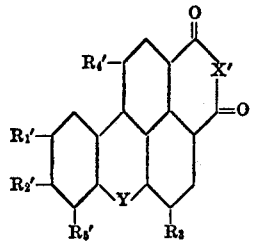

| Ex. | X' | Y | $R_1'$ | $R_2'$ | $R_3$ | $R_4$ | $R_5'$ |
|---|---|---|---|---|---|---|---|
| 18 | \N—NH$_2$ | S | OCH$_3$ | H | H | H | H |
| 19 | \N—NH—C$_6$H$_5$ | O | H | H | H | H | CH$_3$ |
| 20 | \N—NH—CO—CH$_3$ | O | OCH$_3$ | H | H | H | H |
| 21 | \N—NH—SO$_2$—C$_6$H$_5$ | O | CH$_3$ | CH$_3$ | H | H | H |
| 22 | \N—NH$_2$ | S | H | H | OCH$_3$ | H | H |
| 23, 24 | \N—C$_6$H$_4$—SO$_2$NH$_2$ | O, S | H | H | OCH$_3$ | H | H |
| 25, 26 | \N—C$_6$H$_4$—SO$_2$NH$_2$ | O, S | OCH$_3$ | H | OCH$_3$ | H | H |
| 27 | \N—CH$_2$—CH$_2$—CH$_2$—OH | O | OCH$_3$ | H | H | H | H |
| 28 | \N—CH$_2$—CO—NH$_2$ | O | CH$_3$ | Cl | H | H | H |
| 29 | \N—CH$_2$—COOH | O | H | OCH$_3$ | H | H | H |
| 30 | \N—NH$_2$ | O | OCH$_3$ | H | OCH$_3$ | OCH$_3$ | H |
| 31 | \N—C$_6$H$_4$—NH$_2$ | O | OCH$_3$ | H | H | H | H |
| 32 | \N—C$_6$H$_5$ | O | OCH$_3$ | H | OCH$_3$ | H | H |
| 33 | O | O | H | H | OCH$_3$ | H | H |
| 34 | O | O | OCH$_3$ | H | H | H | H |
| 35 | \N—CH$_2$—CH$_2$—O—COCH$_3$ | O | OCH$_3$ | H | H | H | H |
| 36, 37 | \N—pyridyl | O, S | H | CH$_3$ | H | H | H |
| 38 | \N—NH—benzothiazolyl | O | H | H | OCH$_3$ | H | H |

| Ex. | X' | Y | R₁' | R₂' | R₃ | R₄ | R₅' |
|---|---|---|---|---|---|---|---|
| 39 | \N—NH—CH₂—CH₂—CN / | S | H | H | OCH₂CH₂OH | H | H |
| 40 | \N—NH—⟨C₆H₃⟩—Cl (Cl) / | O | H | H | H | H | CH₃ |
| 41 | \N—NH—⟨C₆H₄⟩—SO₂NH₂ / | O | H | H | H | H | H |
| 42 | \N—NH—⟨C₆H₄⟩—SO₂NH₂ / | O | H | H | H | H | Cl |
| 43, 44 | \N—NH—CO—⟨C₆H₄⟩—CH₃ / | O, S | H | H | H | H | Cl |
| 45 | \N—NH—(benzimidazolyl-SO₂NH₂) / | O | OCH₃ | H | H | H | H |

We claim:
1. A daylight fluorescent pigment consisting essentially of a fluorescent dyestuff of the formula

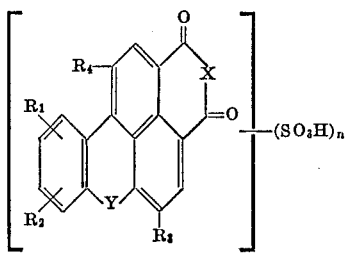

We claim:
X is oxygen or >N—R in which R is hydrogen, hydroxy, amino-alkyl of 1 to 18 carbon atoms, hydroxy-lower alkyl, lower alkoxy-lower alkyl, lower alkoxy - lower alkoxy - lower alkyl, carboxy-lower alkyl, acetoxy-lower alkyl, phenyl-lower alkyl, di(lower alkyl)-amino-lower alkyl, carbamoyl-lower alkyl, cyclohexoxy-lower alkyl, cyclohexyl, phenyl, sulfamidophenyl, carbamoylphenyl, aminophenyl, lower alkyl-phenyl, lower alkoxy-phenyl, hydroxyphenyl, chlorophenyl, bromophenyl, di(lower alkyl)-phenyl, di(lower alkoxy)-phenyl, triazinyl, pyridyl or —NH—Z in which Z is hydrogen, lower alkyl, hydroxy-lower alkyl, phenyl, chlorophenyl, dichlorophenyl, sulfamidophenyl, phenylsulfonyl, acetoxy, benzoyl, methylbenzoyl, benzimidazolyl or benzthiazolyl;

$R_1$ and $R_2$ each is hydrogen, chlorine, bromine, alkyl of 1 to 18 carbon atoms, lower alkoxy, carbo-lower alkoxy, phenyl or cyano;

$R_3$ is alkyl, chloroalkyl, bromoalkyl, hydroxyalkyl, alkoxyalkyl, aryloxyalkyl, arylalkyl or acyloxyalkyl;

$R_4$ is hydrogen, nitro, alkoxy or alkoxy substituted by hydroxy, chlorine, bromine, cyano, phenyl or acyloxy;

Y is oxygen or sulfur; and n is an integer of 0 to 3, and of a condensation resin carrier for said dyestuff that is an interlaced polyester of polycarboxylic acid or acid anhydride, unplasticized and unmodified acid amide-formaldehyde, unplasticized alcohol-modified acid amide-formaldehyde, unplasticized and unmodified aminotriazine-formaldehyde, unplasticized alcohol-modified aminotriazine-formaldehyde, arylsulfonamide-acid amide-formaldehyde or arylsulfonamide - aminotriazine - formaldehyde resin, said pigment being in particles of about 0.1 to about 30 microns.

2. A daylight fluorescent pigment according to claim 1 wherein X is >N—NH₂, each of $R_1$, $R_2$, $R_3$ and $R_4$ is hydrogen, Y is oxygen and n is 0.

3. A daylight fluorescent pigment according to claim 1 wherein X is oxygen.

4. A daylight fluorescent pigment according to claim 1 wherein X is >N—NH—Z in which Z is hydrogen or arylsulfonyl.

References Cited
UNITED STATES PATENTS

| | | | |
|---|---|---|---|
| 2,938,873 | 5/1960 | Kazenas | 252—301.2 R |
| 3,367,937 | 2/1968 | Fuchs et al. | 260—281 |
| 3,357,985 | 12/1967 | Fuchs et al. | 260—281 |
| 3,412,035 | 11/1968 | McIntosh et al. | 252—301.2 R |
| 3,502,678 | 3/1970 | Fuchs et al. | 260—281 |

DANIEL E. WYMAN, Primary Examiner

A. P. DEMERS, Assistant Examiner

U.S. Cl. X.R.

106—22, 28, 288 Q; 117—33.5 R; 260—29.1 R, 37 P, 38, 39 P, 40 R, 281, 328, 335